United States Patent
Hashida et al.

(10) Patent No.: US 8,025,345 B2
(45) Date of Patent: Sep. 27, 2011

(54) VEHICLE BRAKE SYSTEM

(75) Inventors: Koichi Hashida, Kariya (JP); Yusuke Morikawa, Inuyama (JP); Masayuki Naito, Takahama (JP); Koichi Kokubo, Nagoya (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 814 days.

(21) Appl. No.: 12/073,654

(22) Filed: Mar. 7, 2008

(65) Prior Publication Data

US 2008/0236959 A1    Oct. 2, 2008

(30) Foreign Application Priority Data

Mar. 27, 2007 (JP) .................................. 2007-080725
Feb. 1, 2008 (JP) .................................. 2008-022420

(51) Int. Cl.
*B60T 8/34* (2006.01)
(52) U.S. Cl. .................................. 303/113.4; 303/115.1
(58) Field of Classification Search .............. 303/113.4, 303/113.5, 114.1–114.3, 115.1–115.4
See application file for complete search history.

(56) References Cited

U.S. PATENT DOCUMENTS

| 2005/0269875 | A1 | 12/2005 | Maki et al. |
| 2006/0163941 | A1 | 7/2006 | Von Hayn et al. |
| 2006/0214504 | A1* | 9/2006 | Kusano .................. 303/113.4 |

FOREIGN PATENT DOCUMENTS

JP         2003-11808 A    1/2003

* cited by examiner

*Primary Examiner* — Melanie Torres Williams
(74) *Attorney, Agent, or Firm* — Buchanan Ingersoll & Rooney PC

(57) ABSTRACT

A vehicle brake system, capable of realizing a brake-by-wire construction which can be installed in vehicles in the same manner as conventional brake systems, is provided with a booster device, a master cylinder, wheel brakes, and a hydraulic pressure control device interposed between the master cylinder and the wheel brakes. The system is further provided with a stroke sensor for detecting the moving stroke of a brake pedal, a simulator for applying to the brake pedal a pseudo reaction force corresponding to the moving stroke of the brake pedal, a play or idling component arranged between the booster device and the hydraulic pressure control device for absorbing the moving stroke of the brake pedal by a predetermined amount, and an electronic control device for controlling the hydraulic pressure control device based on an input from the stroke sensor.

12 Claims, 10 Drawing Sheets

VEHICLE BRAKE SYSTEM

INCORPORATION BY REFERENCE

This application is based on and claims priority under 35 U.S.C. 119 with respect to Japanese Applications No. 2007-080725 filed on Mar. 27, 2007 and No. 2008-022420 filed on Feb. 1, 2008, the entire contents of which are incorporated herein by reference.

BACKGROUND OF THE INVENTION

1. Field of the Invention

The present invention relates to a vehicle brake system capable of realizing a brake-by-wire in which a braking manipulation section is connected with a braking operation section by means of electric signals.

2. Discussion of the Related Art

In a so-called "brake-by-wire" wherein a braking manipulation section comprising a brake pedal and the like and a braking operation section comprising wheel brakes and the like are connected with each other by means of electric signals, the braking manipulation section is mechanically isolated from the braking operation section, and thus, it does not take place that unpleasant vibration is transmitted to the brake pedal when the brake force is varied upon anti-lock braking operation for example. Further, the brake-by-wire is advantageous to electric vehicles and hybrid vehicles which have a regenerative brake device, because the brake force by the wheel brakes can be varied to compensate for the variation in the regenerative brake force without giving the driver any uncomfortable feeling in manipulating the brake pedal even when the regenerative brake force is varied for some reason.

In a complete brake-by-wire, measures are taken to avoid the situation that the brake becomes unable to operate in the event of a failure in the electric system. For example, as described in Japanese unexamined, published patent application No. 2003-011808, there has been proposed a system wherein a master cylinder pressure is generated by a brake pedal and wherein the connection of a master cylinder to wheel brakes is blocked while the electric system is correctly operating. In the proposed system, however, when the electric system falls in failure, the connection of the master cylinder to the wheel brakes is completed, and for reduction in the probability that the electric power supply system breaks down completely, there are employed double electric power supply systems.

Further, United States patent application publication No. US2006/0163941 A1 (equivalent of Japanese international application publication No. 2005-532220) describes a brake-by-wire actuator for vehicle brake systems. In the actuator, a simulator operable by a brake pedal is provided, a signal from an actuation sensor provided in the simulator is transmitted to an electronic control unit for controlling a hydraulic pressure source in dependence on the signal, and the output from the hydraulic pressure source is connected to a brake force distribution device to operate wheel brakes. Further, means is provided for enabling the driver to operate the brakes with the driver's muscle power. In the brake actuator, in order that counterforce generated from the vehicle brake system is mechanically isolated not to be transmitted to a brake pedal in a by-wire mode, an idle space or distance is provided between the brake pedal or a member being in linkage to the same and an operating member which is connected at a downstream in a transmission train for a manipulation input.

Further, although being not classified in the brake-by-wire type, a vehicle brake device which is described in United States patent application publication No. US2005/0269875 A1 (equivalent of Japanese unexamined, published patent application No. 2005-349880) has been known as measures for realizing the cooperation with regenerative brake. The known vehicle brake device is provided with a hydraulic brake device, which is operable to increase the driver's braking manipulation force by a booster device in a predetermined boosting ratio, to generate a base hydraulic pressure depending on the increased braking manipulation force from a master cylinder connected to the booster device, to apply the generated base hydraulic pressure to wheel brakes (wheel cylinders) connected to the master cylinder through passages with hydraulic pressure control valves thereon to generate a base hydraulic brake force on respective wheels, and to supply the wheel brakes with a controlled hydraulic pressure which is built up by driving pumps so that a controlled hydraulic brake force can be applied to the respective wheels.

Further, the device of the last mentioned United States publication is provided with a regenerative brake device, which, by applying an allocated regenerative brake force to some wheels, generates a target brake force corresponding to a braking manipulation force in combination with the base hydraulic brake force, and variation detection, means for detecting the variation of the regenerative brake force being actually generated by the regenerative brake device, from the allocated regenerative brake force. When a substantial variation is detected by the variation detection means, a controlled hydraulic pressure is generated by driving the pumps of the hydraulic brake device and by controlling the hydraulic pressure control valves to generate a controlled hydraulic brake force on the vehicle wheels in dependence on the controlled hydraulic pressure, so that a deficiency of the regenerative force can be compensated for the variation detected by the variation detection means.

However, in the vehicle brake system described in the first mentioned Japanese application, the reliability in avoiding the complete failure of the electrical system is enhanced, but an increase in cost caused by duplicating the power supply system is unavoidable.

In the vehicle brake system described in the second mentioned United States publication, the manipulation of the brake pedal is mechanically transmitted all the time to the wheel brakes without depending on electric signals, and hence, a brake force approximately equal to that in the properly operating state can be secured even in the event of the malfunction of the electric system. On the contrary, however, the brake-by-wire actuator should be mounted at a position where a vacuum booster device and a master cylinder would otherwise be mounted in conventional vehicles and to which a manipulation force from the brake pedal would be applied, and further, there is need a device such as, e.g., ABS or the like which controls the vehicle brakes individually. Therefore, great restraints are imposed on the cost as well as on the design for installation in the vehicle.

In the vehicle brake device described in the last mentioned United States publication, the manipulation of the brake pedal is mechanically transmitted all the time to the wheel brakes, and hence, the reliability against the breakdown of the electric system is enhanced. In the device, on the contrary, the regenerative brake force cannot bear the entirety of the brake force required for the vehicle. Further, where the regenerative brake force varies in the course of a braking operation, the total brake force which depends on the braking manipulation force being exerted on the brake pedal can be maintained invariable by adjusting the controlled hydraulic brake force to compensate for the variation in the regenerative brake force. Adjusting the controlled hydraulic brake force involves adjusting the operation of the pumps which generate a controlled hydraulic pressure for the controlled hydraulic brake force, and this results in consuming the brake fluid from the master cylinder by the pumps, so that the variation in the stroke of the brake pedal is unavoidable. Where the regenerative brake force is increased, the variation in the brake pedal stroke becomes greater, and this may cause the driver to have an unpleasant feeling. These problems arise as a natural consequence from the fact that the brake-by-wire is not realized in the vehicle brake device described in the last mentioned United States publication.

SUMMARY OF THE INVENTION

Accordingly, it is a primary object of the present invention to provide an improved vehicle brake system capable of maintaining advantages of the construction that the manipulation of a brake pedal is mechanically transmitted to wheel brakes and nevertheless, of realizing a brake-by-wire construction which can be installed in vehicles in the same manner as conventional brake systems.

Briefly, according to the present invention, there is provided an improved vehicle brake system, the feature in construction of which resides in that an idling component for absorbing the moving stroke of a brake pedal by a predetermined amount is arranged between a booster device for boosting the braking manipulation force exerted on the brake pedal and a hydraulic pressure control device having a pump for drawing operating fluid on the side of the master cylinder to discharge the operating fluid toward the side of the wheel brakes and a hydraulic pressure control valve. With this construction, when the brake pedal is stepped on, the idling component absorbs a part of the manipulation stroke of the brake pedal, while an electronic control device controls the hydraulic pressure control valve based on a detection signal from a stroke sensor for detecting the manipulation stroke of the brake pedal, whereby a required controlled hydraulic pressure is supplied to wheel brakes. According to the brake system, there can be realized a brake-by-wire configuration in which even in the event of a failure in the electric system, it is possible to secure a brake force equivalent to that generated in a normal operation state.

Another aspect of the present invention provides an improved vehicle brake system, the feature in construction of which resides in that a fluid absorbing mechanism for absorbing the moving stroke of a brake pedal by a predetermined amount is arranged between a master cylinder and a hydraulic pressure control device and that a cut valve is arranged between the maser cylinder and the fluid absorbing mechanism for blocking the communication between the maser cylinder and the fluid absorbing mechanism when an abnormality in the system causes the pump to be incapable of discharging pressurized fluid. Thus, in the event of a system abnormality, the cut valve operates to prevent the fluid absorbing mechanism from absorbing the fluid discharged from the master cylinder. Accordingly, in the event of the pump falling in a failure, the fluid discharged from the master cylinder is prevented from being consumed by the fluid absorbing mechanism by closing the cut valve. This avoids the elongation of the brake pedal stroke, so that it can be realized to secure the brake force which is substantially equivalent to that generated in a normal operation state.

BRIEF DESCRIPTION OF THE ACCOMPANYING DRAWINGS

The foregoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which.

DETAILED DESCRIPTION OF THE PREFERRED EMBODIMENTS

First Embodiment

Figure 1:
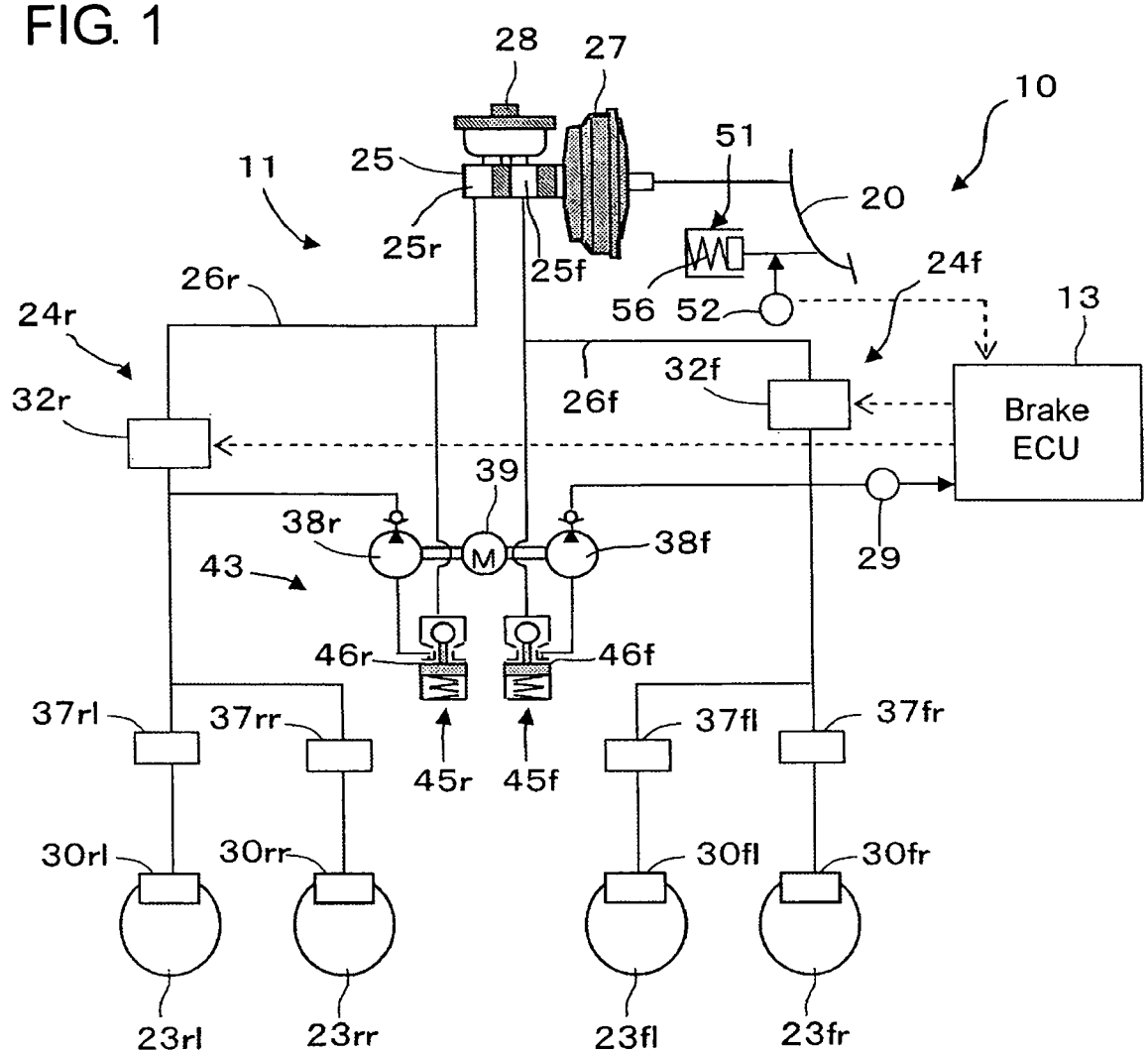
FIG. 1 is a system diagram of a vehicle brake system in a first embodiment according to the present invention.
Figure 2:
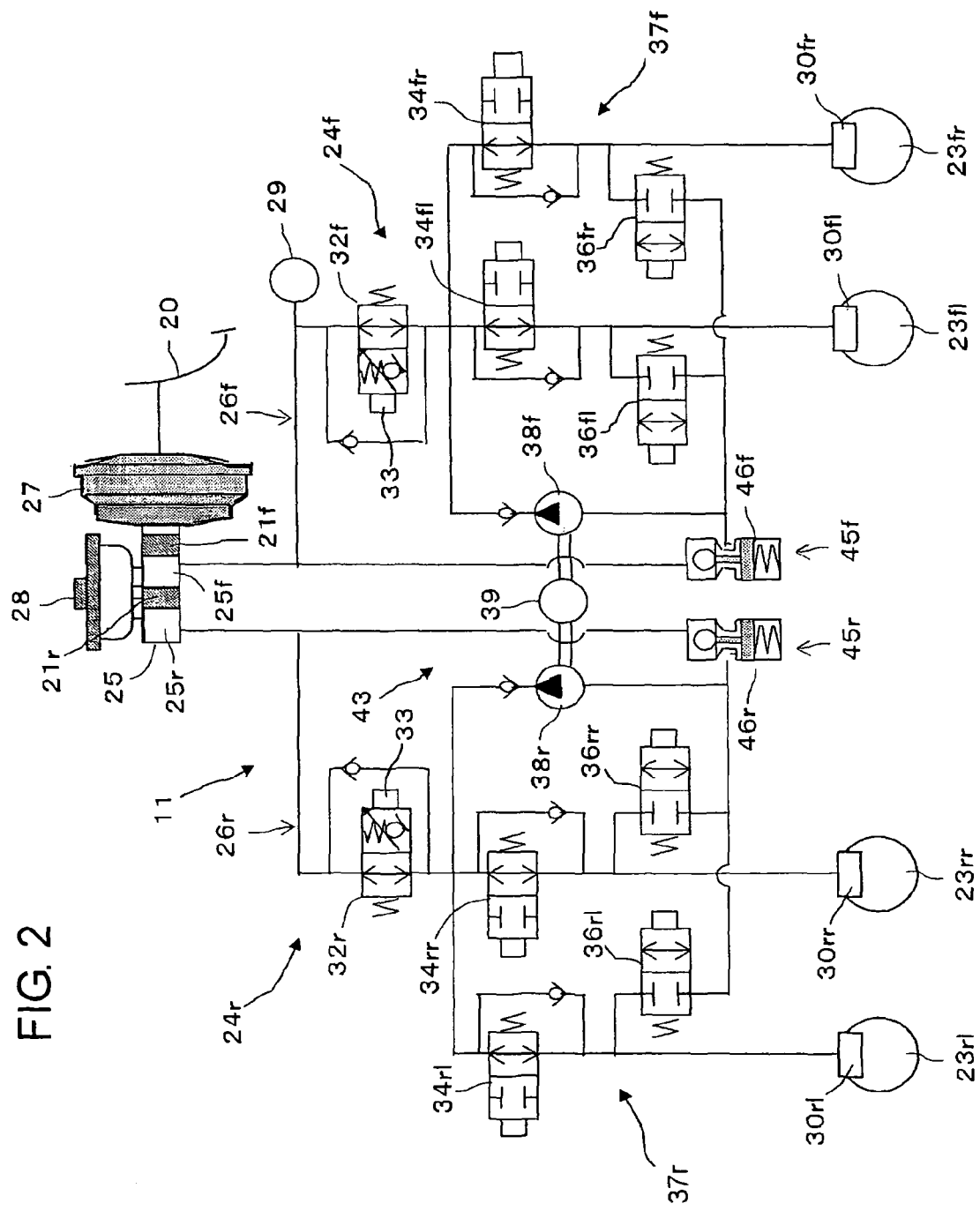
FIG. 2 is a circuit diagram of a hydraulic brake device of the vehicle brake system.

Hereafter, a vehicle brake system of the brake-by-wire type in a first embodiment according to the present invention will be described with reference to the accompanying drawings. Referring now to FIGS. 1 and 2, the vehicle brake system generally designated by reference numeral 10 comprises a hydraulic brake device 11, an ECU 13 for controlling the hydraulic brake device 11 and the like.

The hydraulic brake device 11 is provided with left and right front wheel brakes 30*fl*, 30*fr* for left and right front wheels 23*fl*, 23*fr* and left and right rear wheel brakes 30*rl*, 30*rr* for left and right rear wheels 23*rl*, 23*rr*. As well-known in the art, each of these brakes 30*fl*, 30*fr* and 30*rl*, 30*rr* is a disc brake or a drum brake which includes at least one brake cylinder for operating brake shoes to restrict the rotation of a brake disc or drum rotatable with a tire (all not shown). A front wheel brake system 24*f* for the front wheel brakes 30*fl*, 30*fr* and a rear wheel brake system 24*r* for the rear wheel brakes 30*rl*, 30*rr* are of almost the same construction but are provided in separation from each other. When the driver manipulates a brake pedal 20, the front and rear wheel brake systems 24*f*, 24*r* cause the front wheel brakes 30*fl*, 30*fr* and the rear wheel brakes 30*rl*, 30*rr* to generate brake forces independently.

In FIGS. 1 and 2, components which perform the same operation or function are designated by the same reference numerals, and the components for the front wheel brake system 24f are distinguished from those for the rear wheel brake system 24r by a suffix following the numerical designation, wherein the suffix "f" is used to denote the components for the front wheel brake system 24f, while the suffix "r" is used to denote the components for the rear wheel brake system 24r. Further, in the same system, the components for the left wheels are distinguished from those for the right wheels by a second suffix "l" or "r" following the suffix "f" or "r". Throughout the specification, the designation by each reference numeral only is used from time to time to generally designate components without discrimination between front, rear, left and right.

Reference numeral 25 denotes a dual master cylinder, in which two master pistons 21f, 21r (refer to FIG. 2) are slidably received for respectively generating a brake pressure in two hydraulic chambers 25f, 25r. With sliding movements of the master pistons 21f, 21r, brake fluids of the quantities depending on the movements of the master pistons 21f, 21r are discharged from the hydraulic chambers 25f, 25r to passages 26f, 26r, respectively. Reference numeral 28 denotes a reservoir tank storing brake fluid, which replenishes brake fluid to the hydraulic chambers 25f, 25r in the master cylinder 25.

Figure 3:
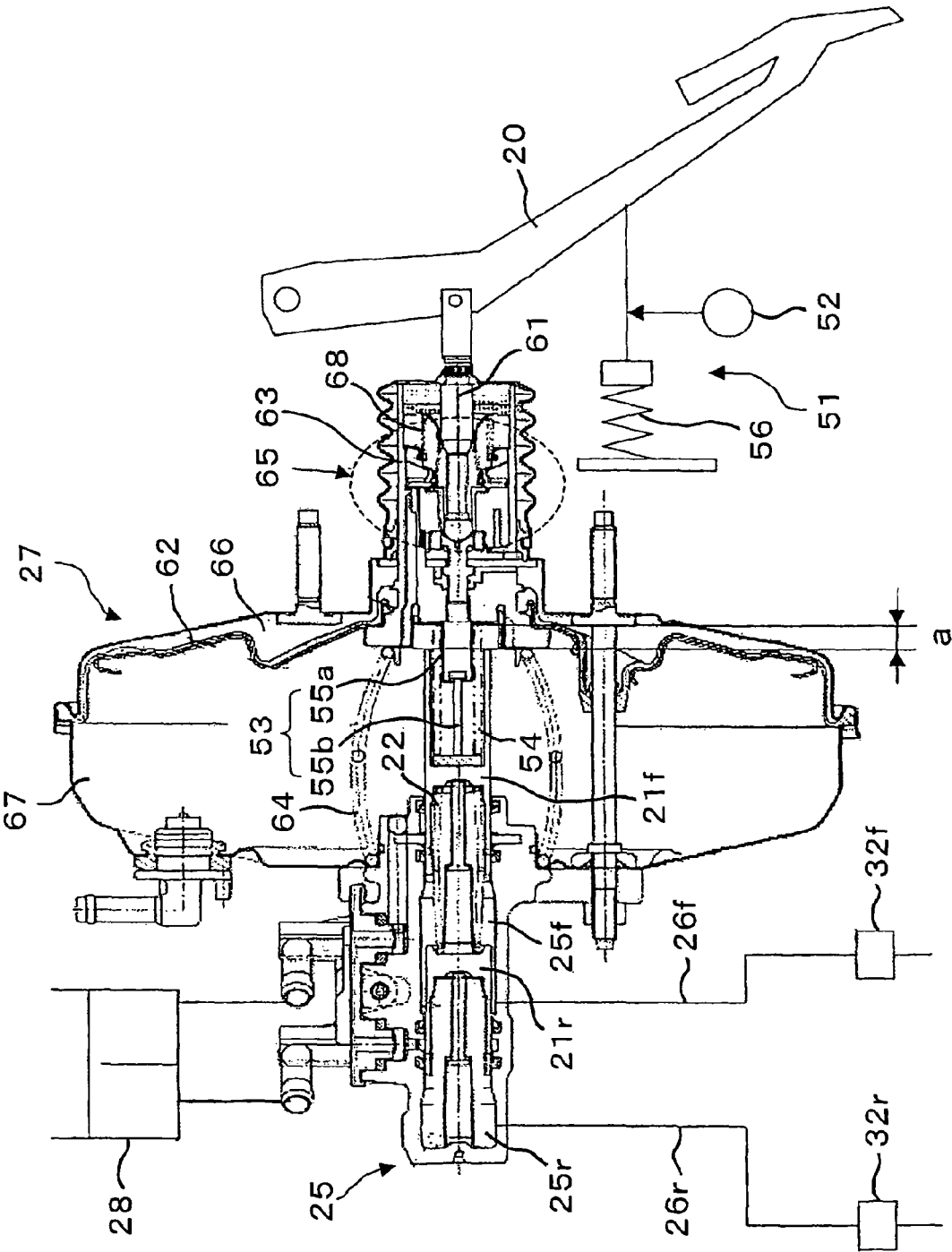
FIG. 3 is a longitudinal sectional view showing the connection between a brake pedal, a booster device and a master cylinder of the hydraulic brake device.

Reference numeral 27 is a vacuum type booster device as booster device interposed between the brake pedal 20 and the master cylinder 25. As shown in FIG. 3, the vacuum type booster device 27 is composed of an input rod 61 connected to the brake pedal 20, a diaphragm 62 responsive to an intake vacuum from a combustion engine (not shown), a valve piston 63 movable with the diaphragm 62, a spring 64 for urging the valve piston 63 toward the brake pedal 20 side, and an air valve section 65 which is built in the valve piston 63 and is operated to be opened and closed by the manipulation of the brake pedal 20. On the opposite sides of the diaphragm 62, there have been arranged a variable pressure chamber 66 for atmospheric air to be leadable and a low pressure chamber 67 for intake vacuum to be led from the engine.

When the brake pedal 20 is manipulated, the air valve section 65 is operated to block the communication between the variable pressure chamber 66 and the low pressure chamber 67 partitioned by the diaphragm 62 and to introduce the atmospheric air into the variable pressure chamber 66, whereby a pressure difference is generated between the variable pressure chamber 66 and the low pressure chamber 67. This pressure difference causes the valve piston 63 to advance together with the diaphragm 62 against the urging force of the spring 64 in a manner to follow the movement of the brake pedal 20.

The vacuum type booster device 27 does not use a rubber disc which is usually used to transmit a part of the output power toward the brake pedal 20 side. Thus, in the vacuum type booster device 27, when the brake pedal 20 is manipulated, no other force than a weak force like that of a spring 68 which is used for pressing the air valve section 65 is transmitted toward the brake pedal 20 side.

A simulator 51 is provided for imparting to the brake pedal 20 a false, simulated or pseudo reaction force corresponding to the braking manipulation stroke. The simulator 51 is composed of a plurality of springs 56 and the like for being moved a predetermined amount in dependence on the manipulation force on the brake pedal 20. The springs 56 are connected to the brake pedal 20 on one end side and to a fixed part of the vehicle on the other end side. On one end side, the springs 56 may be connected not to the brake pedal 20, but to another component which is moved in synchronism relation with the brake pedal 20.

The simulator 51 is provided with a stroke sensor 52, and the stroke sensor 52 detects the moving distance or stroke of the brake pedal 20 to transmit a detection signal to the brake ECU 13. The brake ECU 13 has beforehand stored target brake forces relative to output values of the stroke sensor 52 and hydraulic brake forces which are to be generated on each wheel 23 when each wheel brake 30 is supplied with a hydraulic pressure, in a memory in the form of tables or arithmetic expressions.

Figure 4:
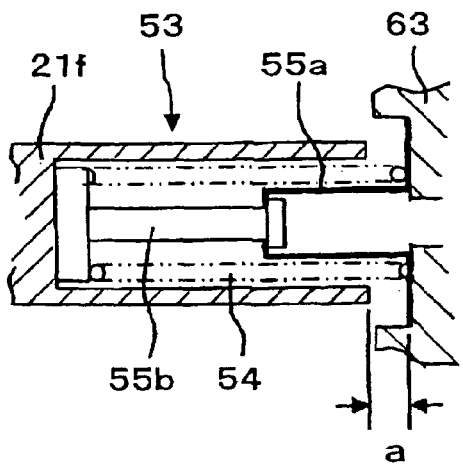
FIG. 4 is a fragmentary enlarged sectional view of a stroke absorbing mechanism incorporated in a part of the structure shown in FIG. 3.

Reference numeral 53 denotes a stroke absorbing mechanism as play or idling component for absorbing by a predetermined amount the moving stroke in a braking manipulation given by the driver. The mechanism 53 is arranged between the valve piston 63 of the vacuum type booster device 27 and the master piston 21f of the master cylinder 25. As shown in FIG. 4 in an enlarged scale, the stroke absorbing mechanism 53 is composed of two suspending members 55a, 55b relatively movable within a predetermined amount and a compression spring 54 interposed between the suspending members 55a, 55b. That is, one of the suspending members 55a is held in contact with the valve piston 63, while the other suspending member 55b is held in contact with the master piston 21f. In a normal or ordinary state, the suspending member 55b is urged forward relative to the suspending member 55a by means of the urging force of the spring 54 to hold the suspending members 55a, 55b in position to engage with each other, so that the maximum length of the spring 54 is restrained to set the play or idle stroke (a).

Desirably, the setting load of the spring 54 is set to be greater than that of the spring 22 acting on the master piston 21f.

As shown in FIGS. 1 and 2, the front and rear wheel brake systems 24f, 24r are respectively provided therein with solenoid-operated proportional hydraulic control valves (hereafter referred to simply as "proportional control valves") 32f, 32r each constituting a hydraulic pressure control valve, and inlet ports of the proportional control valves 32f, 32r are connected to the hydraulic chambers 25f, 25r of the master cylinder 25 through passages 26f, 26r, respectively. Each proportional control valve 32 is operable to perform pressure control so that the hydraulic pressure at the outlet port becomes higher from zero to a controlled differential pressure than that at the inlet port in dependence on a control current applied to a linear solenoid 33 thereof. A check valve (not numbered) for allowing fluid flow from the inlet port to the outlet port only is connected between the inlet and outlet ports of each proportional control valve 32 in parallel to bypass the same. In the ordinary state, each proportional control valve 32 remains shifted to an open position with the linear solenoid 33 being deenergized, to make direct communication between the inlet and outlet ports.

The passage 26f is branched on the outlet port side of the proportional control valve 32f to be connected to left and right front wheel brakes 30fl, 30fr through an ABS control valve unit 37f which is composed of solenoid-operated shutoff valves 34fl, 34fr and 36fl, 36fr. Likewise, the passage 26r is branched on the outlet port side of the proportional control valve 32r to be connected to left and right rear wheel brakes 30rl, 30rr through another ABS control valve unit 37r which is composed of solenoid-operated shutoff valves 34rl, 34rr and 36rl, 36rr. These ABS control valve units 37f, 37r may be integrated as a single valve unit.

Discharge ports of pumps 38f, 38r driven by an electric motor 39 are connected to between the outlet ports of the proportional control valves 32f, 32r and the inlet ports of the ABS control valve units 37f, 37r through check valves (not numbered) which prevents fluid from flowing toward the discharge ports, respectively. Suction ports of the pumps 38f, 38r are connected to the inlet ports of the proportional control valves 32f, 32r through pressure responsive valves 45f, 45r which are connected to the outlet ports of the ABS control valve units 37f, 37r, respectively. The pressure responsive valves 45f, 45r are provided with reservoirs 46f, 46r, each of which is constituted by air-tightly closing a bottomed cup-shape casing with a piston being urged by a weak spring. The pressure responsive valves 45f, 45r are operated to be opened to make the suction ports of the pumps 38f, 38r communicate with the hydraulic chambers 25f, 25r of the master cylinder 25 when the reservoirs 46f, 46r become empty, respectively. The pressure responsive valves 45f, 45r also serve as temporal fluid accumulators of fluids discharged from the ABS control valve units 37f, 37r, respectively.

The pumps 38, the electric motor 39, the proportional control valves 32 and the like constitute a controlled hydraulic pressure control device 43 which is capable of applying to the wheel brakes 30 controlled hydraulic pressures generated by driving the pumps 38, thereby to generate controlled hydraulic brake forces on the wheels 23 associated with the wheel brakes 30. The controlled hydraulic pressure control device 43 is interposed between the master cylinder 25 and the wheel brakes 30 and generates the controlled hydraulic pressures through driving the pumps 38. The hydraulic brake device 11 is composed of the controlled hydraulic pressure control device 43, the vacuum type booster device 27, the master cylinder 25 and the wheel brakes 30.

The brake ECU 13 sets a target brake force to be generated on the wheels 23 in dependence on the moving stroke of the brake pedal 20, calculates a hydraulic brake force based on the target brake force and further calculates controlled hydraulic pressures which are to be applied to respective wheel brakes 30 to make the wheels 23 generate the hydraulic brake force. Further, the brake ECU 13 applies control electric currents to the linear solenoids 33 of the proportional control valves 32 so that the hydraulic pressures supplied to the wheel brakes 30 from the pumps 38 driven by the electric motor 39 come to coincidence with the controlled hydraulic pressure.

Further, the brake ECU 13 executes respective programs in response to the detection signals from a hydraulic pressure sensor 29, wheel speed sensors (not shown) which detect wheel speeds of the respective wheels 23, and other sensors and outputs control signals to the proportional control valves 32f, 32r, the ABS control valve units 37f, 37r, the electric motor 39 and the like so that control hydraulic pressures are supplied to the wheel brakes 30 to make each wheel 23 generate a desired hydraulic brake force.

The aforementioned brake ECU 13 constitutes an electronic control device for controlling the hydraulic pressure control device 43 in response to the input from the stroke sensor 52.

Next, description will be made regarding the operation of the vehicle brake system 10 in the first embodiment as constructed above. When the brake pedal 20 is stepped on, the input rod 61 of the vacuum type booster device 27 is advanced to bring the air valve section 65 into an atmospheric air leading state, whereby the atmospheric air is introduced into the variable pressure chamber 66. Thus, the valve piston 63 of the vacuum type booster device 27 is advanced as it nearly follows the input rod 61, to push the stroke absorbing mechanism 53. As mentioned earlier, the setting load of the spring 54 of the stroke absorbing mechanism 53 has been set to be greater than the setting load of the spring 22 acting on the master piston 21f. Thus, at an early stage of the stepping operation of the brake pedal 20, the stroke absorbing mechanism 53 is not deformed and does not act effectively, and instead, the master pistons 21f, 21r of the master cylinder 25 are first advanced to block the communications between the hydraulic chambers 25f, 25r of the master cylinder 25 and the reservoir tank 28. This causes the hydraulic pressure in the hydraulic chambers 25f, 25r of the master cylinder 25 to increase. Thus, the load which is determined by multiplying the increased hydraulic pressure with the chamber cross-section area of the master cylinder 25 acts on the stroke absorbing mechanism 53, whereby the spring 54 of the stroke absorbing mechanism 53 is compressed to absorb the amount of the play or idle stroke (a). As a consequence, the valve piston 63 of the vacuum type booster device 27 is advanced relative to the master pistons 21f, 21r.

In this way, even when the brake pedal 20 is stepped on, the stroke absorbing mechanism 53 acts through its stroke absorbing function to suppress the master pistons 21f, 21r to move a shorter distance than the movement of the valve piston 63 of the vacuum type booster device 27, so that a low pressure meeting the shorter distance only is generated in the hydraulic chambers 25f, 25r of the master cylinder 25.

Figure 5:
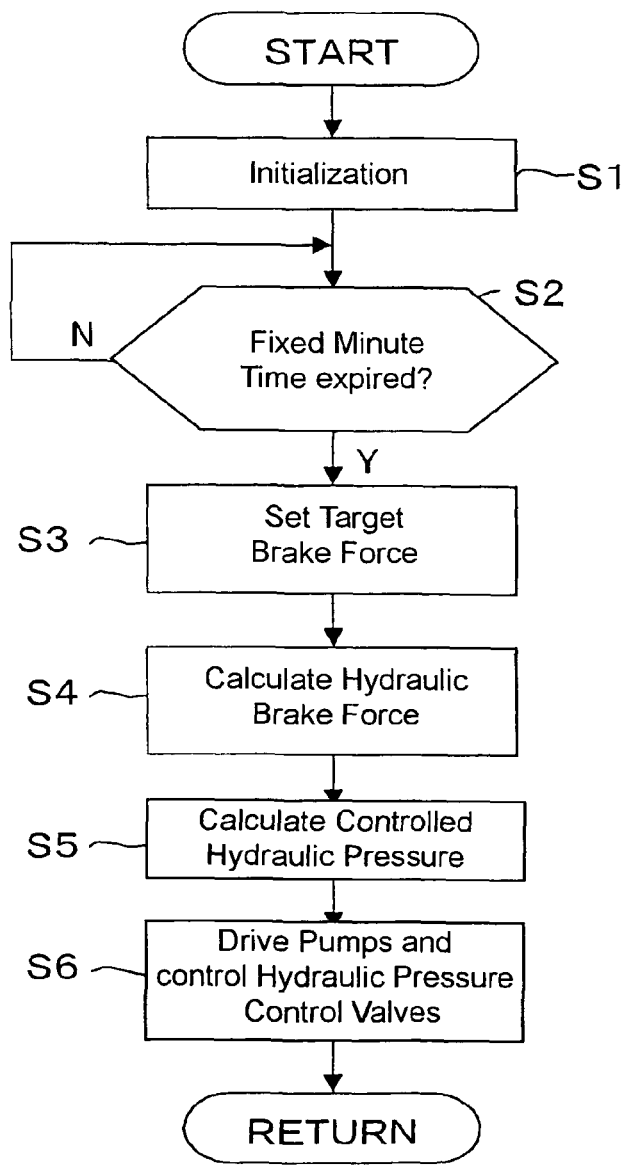
FIG. 5 is a flow chart of a control program executed by a brake ECU shown in FIG. 1.

On the other hand, the simulator 51 causes the brake pedal 20 to receive a reaction force corresponding to the manipulation stroke or movement of the brake pedal 20. Thus, the driver can feel the reaction force corresponding to the manipulation movement (i.e., stepping amount) of the brake pedal 20, regardless of the hydraulic pressure being generated in the master cylinder 25. The manipulation stroke of the brake pedal 20 is detected by the stroke sensor 52, and when this detection signal is inputted to the brake ECU 13, the same executes the control program shown in FIG. 5 as described hereinafter.

Upon starting of the control program, the brake ECU 13 executes an initialization processing to reset various temporary memories such as counters, flags and the like (step S1) and executes those program steps subsequent to step S2 each time the lapse of a fixed or predetermined minute time is judged (step S2).

The brake ECU 13 first calculates a target brake force to be generated on the wheels 23 by reference to a map, table or calculation expression (all not shown) which has been stored in the memory therein to define the relation between brake pedal strokes and target brake forces (step S3), then calculates a hydraulic brake force based on the target brake force (step S4), and further calculates a controlled hydraulic pressure which is to be supplied to the respective wheel brakes 30 to make the respective wheels 23 generate the hydraulic brake force in cooperation, by reference to one or more other maps, tables or calculation expressions (step S5). Thereafter, the brake ECU 13 starts the electric motor 39 to drive the pumps 38 and applies control electric currents to the linear solenoids 33 of the proportional control valves 32 so that the hydraulic pressure of the brake fluid supplied from the pumps 38 to the wheel brake 30 comes to coincide with the controlled hydraulic pressure (step S6).

Therefore, the pressures of the fluids supplied from the pumps 38 are controlled by the proportional control valves 32 to the controlled hydraulic pressures as required to be supplied to the respective wheel brakes 30. Accordingly, the hydraulic brake device 11 makes the wheels 23 generate respective brake forces which correspond in sum to the target brake force. In order that the pressures applied to the wheel brakes 30 can be controlled to be more precisely, the hydraulic pressure detected by the hydraulic pressure sensor 29 may be used to perform the feedback control of the brake pressures.

If the electric control system in the aforementioned brake system 10 falls in a failure or malfunction, the vacuum type booster device 27 causes the master cylinder 25 to generate a required hydraulic pressure after the stroke absorbing mechanism 53 is deformed or operated through the maximum amount (i.e., longer than the idle stroke (a)), whereby the hydraulic brake forces are generated on the respective wheel brakes 30. In this case, the relation between the brake pedal stroke and the brake force is such that the brake pedal stroke becomes longer by the distance corresponding to the aforementioned idle stroke (a), thereby making the deformation or moving amount of the simulator 51 greater by the distance corresponding to the aforementioned idle stroke (a). Therefore, in light of the relation between the brake pedal stepping force and the brake force, although the brake pedal 20 has to be stepped a greater distance in obtaining the same brake force, a sufficient brake force can be secured even in the event of a single-fold failure or malfunction.

Further, where a failure or malfunction occurs in the vacuum supplied to the vacuum type booster device 27, the input rod 61 is moved to directly push the valve piston 63 as is done in conventional vacuum type booster devices, so that the hydraulic brake device 11 can be operated. In this case, the stepping force exerted on the brake pedal 20 should be sufficiently greater to defeat the forces of the springs incorporated in the vacuum type booster device 27, and hence, the pedal stepping force which is required for the booster device 27 to begin the operation becomes greater than that required in the normal operation state. However, as mentioned earlier, as far as the electric control system remains normally and operates the pumps 38 in dependence on the moving stroke of the brake pedal 20, the hydraulic pressure in the master cylinder 25 can be held to be low, and therefore, an increase in the brake pedal stepping force hardly occurs except that caused by those springs incorporated inside the vacuum type booster device 27. As a result, the relation between the brake pedal stroke and the brake force does not change from that in the normal operation state. In the relation between the brake pedal stepping force and the brake force, a brake force sufficient in the single-fold malfunction state can be secured though the brake pedal stepping force has to be increased by the force caused by the springs which are incorporated inside the vacuum type booster device 27.

As apparent from the foregoing description, the brake system 10 having two means for raising the brake hydraulic pressure, that is, the vacuum booster device 27 and the pumps 38 of the controlled hydraulic pressure control device 43 can be constructed as a brake-by-wire type which is capable of securing a brake force equivalent to that generated in the normal operation state even in the event of a failure or malfunction in the electric control system. Therefore, the brake system 10 can be constructed to be highly reliable against such a failure.

Second Embodiment

Figure 6:
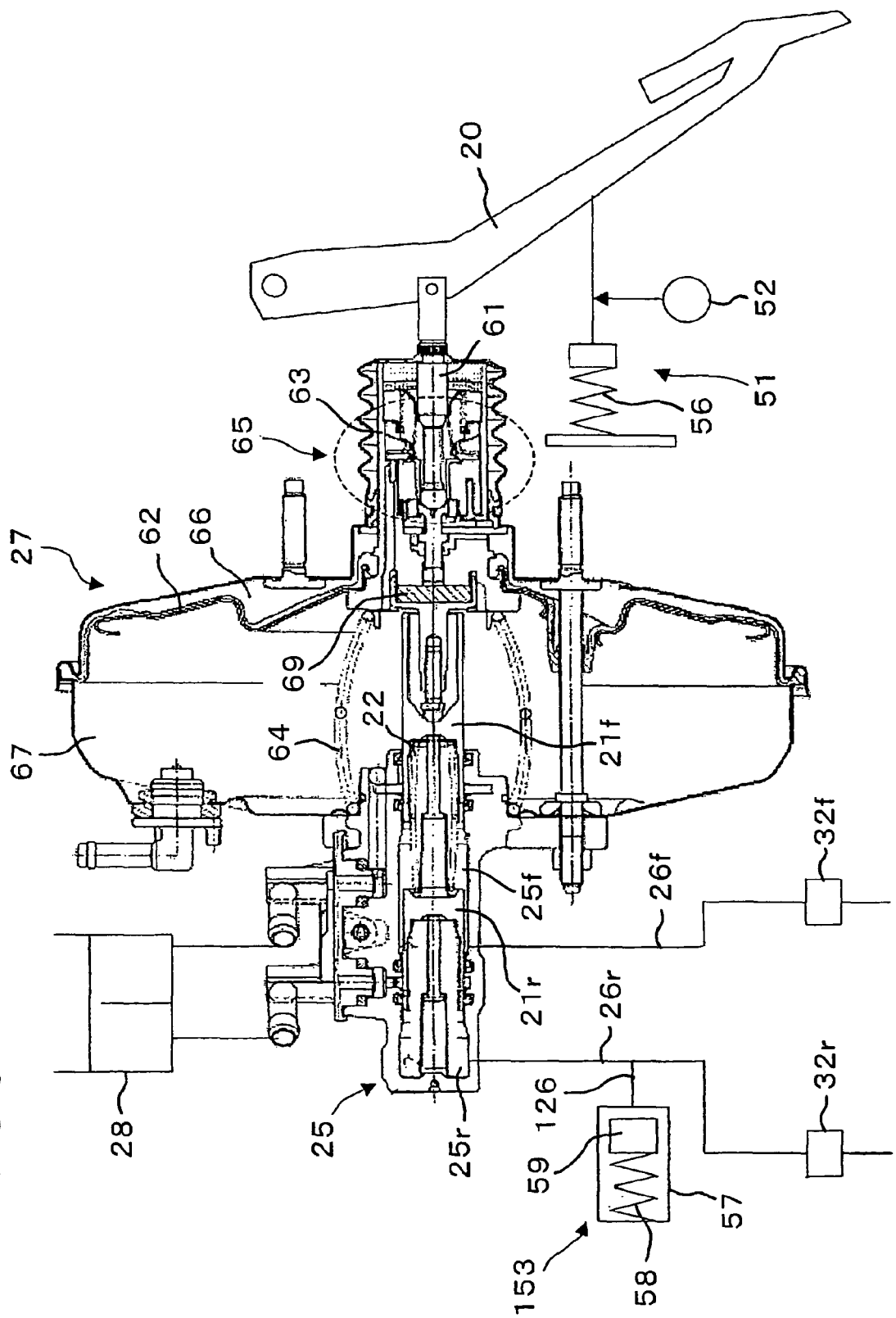
FIG. 6 is a longitudinal sectional view showing the connection between a brake pedal, a booster device and a master cylinder of a hydraulic brake device in a second embodiment according to the present invention.

FIG. 6 shows some components featuring the vehicle brake system in a second embodiment according to the present invention. The brake system in the second embodiment differs from that in the foregoing first embodiment in that a fluid absorbing mechanism 153 is used instead of the stroke absorbing mechanism 53 composed of the spring 54 and the suspending members 55*a*, 55*b* and in that a rubber disc 69 or the like acts to return a reaction force to the brake pedal 20 so that one taking an existing structure can be utilized as the vacuum type booster device 27. Therefore, components different from those in the first embodiment will be described hereafter, and components which are identical or same as those in the first embodiment are designated in FIG. 6 by the same reference numerals and will be omitted from being described in detail.

As shown in FIG. 6, the fluid absorbing mechanism 153 is provided with a bottomed cylinder 57. The bottomed cylinder 57 is connected at one end to a passage 126 branching from the passage 26*r* connected to the hydraulic chamber 25*r* of the master cylinder 25, and is exposed to the atmosphere at the other end. The fluid absorbing mechanism 153 is constructed to fit in the cylinder 57 a piston 59 which is urged by means of a compression spring 58 being weak in the urging force. Preferably, the maximum quantity of the fluid absorbed by the fluid absorbing mechanism 153 is set to be equal to the quantity which is determined by multiplying the chamber cross-section area of the master cylinder 25 with the aforementioned play or idle stroke (a: the maximum deformation amount) which is given to the stroke absorbing mechanism 53 in the foregoing first embodiment.

In the brake system in the second embodiment, when the brake pedal 20 is stepped on, the input rod 61 of the vacuum type booster device 27 is advanced to introduce the atmospheric air into the variable pressure chamber 66, whereby the valve piston 63 of the vacuum type booster device 27 is advanced as it nearly follows the input rod 61. Thus, the master pistons 21*f*, 21*r* of the master cylinder 25 are advanced to block the communications between the hydraulic chambers 25*f*, 25*r* of the master cylinder 25 and the reservoir tank 28 and increase the fluid pressure in the master cylinder 25. With the increase of the fluid pressure in the master cylinder 25, the piston 59 in the fluid absorbing mechanism 153 is slidden in the cylinder 57 against the urging force of the compression spring 58, and the cylinder 57 absorbs the fluid discharged from the master cylinder 25 by the quantity corresponding to the sliding movement of the piston 59. Thus, a low pressure only is generated in the hydraulic chambers 25*f*, 25*r* of the master cylinder 25. As a consequence, like the foregoing first embodiment, the second embodiment can be configured as a system which is highly reliable against a failure or malfunction by incorporating the vacuum type booster device 27 for raising the brake fluid pressure and the pumps 38 of the controlled hydraulic pressure control device 43.

In the second embodiment, since the simulator 51 is provided for applying to the brake pedal 20 a reaction force corresponding to the manipulation stroke of the brake pedal 20, no advantage can be obtained by returning the reaction force toward the brake pedal 20 side. However, as far as the normal operation state is concerned, the output power of the vacuum type booster device 27 is made to be weak as described earlier, and thus, no substantial reaction force is generated even in the utilization of the vacuum type booster device 27 of the nature that returns the reaction force toward the brake pedal 20 side. Therefore, the second embodiment is able to perform the operation equivalent to that described in the foregoing first embodiment and thus, is advantageous in that the vacuum type booster device 27 can be used as its is in the existing configuration.

Third Embodiment

Figure 7:
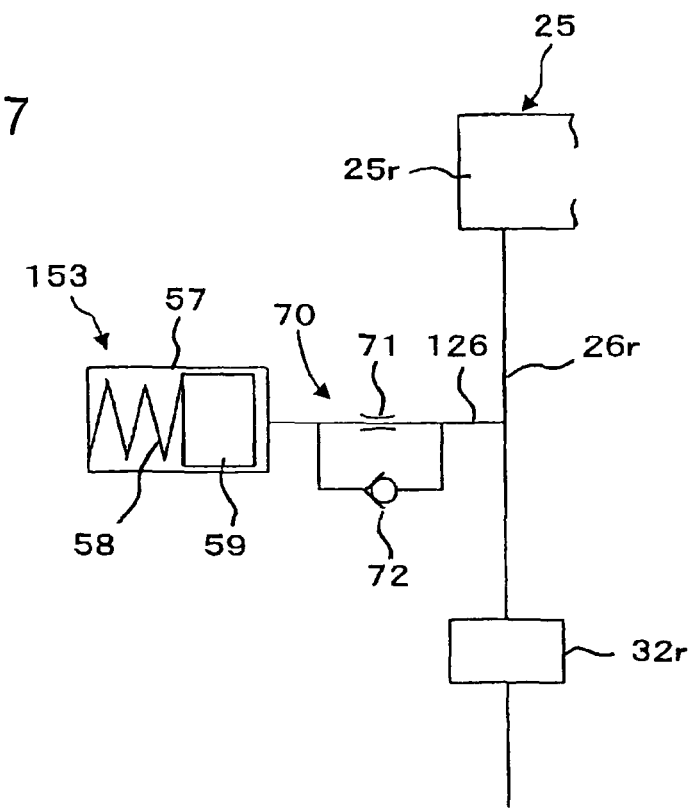
FIG. 7 is a fragmentary circuit diagram of a hydraulic brake device of a vehicle brake system in a third embodiment according to the present invention.

FIG. 7 shows a fragmentary circuit featuring the vehicle brake system in a third embodiment according to the present invention. The brake system in the third embodiment only differs from that in the foregoing second embodiment in that a restriction component 70 for restricting the flow of the fluid absorbed by the fluid absorbing mechanism 153 is added on the inlet port side of the fluid absorbing mechanism 153 as the play or idling component. The restriction component 70 is composed of a fixed throttle 71 and a check valve 72 connected in parallel with the fixed throttle 71 for allowing the fluid flow only from the cylinder 57 to the passage 26r.

In the brake system in the third embodiment, at the time of an abrupt braking manipulation by the driver, the restriction component (the throttle) 70 restrains the quantity of brake fluid flowing into the cylinder 57, and this results in restraining the absorbing speed of the fluid absorbing mechanism 153. It then results that substantial parts of the flow quantities discharged from the master cylinder 25 are supplied to the wheel brakes 30 by way of the check valves (refer to FIG. 2) which are connected in parallel with the proportional control valves 32 remaining in the closed state. As a consequence, the responsiveness required for the brake system at the time of an abrupt braking manipulation can be secured without uselessly employing those of a larger capacity as the pumps 38. The aforementioned restriction component 70 constitutes a damper mechanism for suppressing the speed at which the idling component (i.e., the fluid absorbing mechanism 153) absorbs its play or idle stroke.

The restriction component (damper mechanism) 70 for suppressing the play or idling absorbing seed of the idling component is applicable to the stroke absorbing mechanism 53 described in the foregoing first embodiment. As the damper mechanism in this modified form, there may be preferred a stroke damper for restraining the speed at which the spring 54 in the stroke absorbing mechanism 53 is deformed.

Fourth Embodiment

Figure 8:
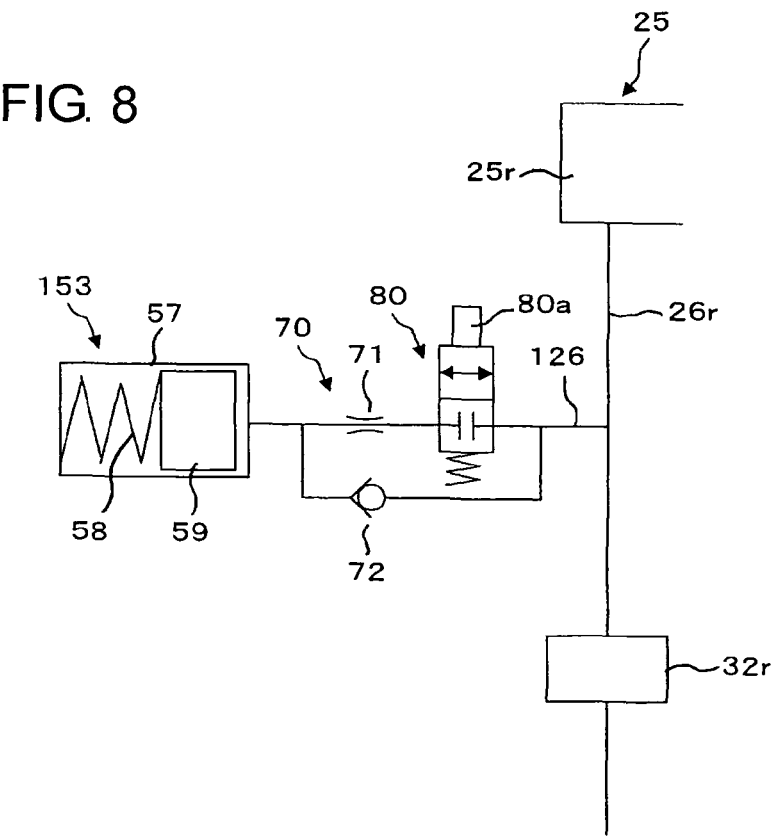
FIG. 8 is a fragmentary circuit diagram of a hydraulic brake device of a vehicle brake system in a fourth embodiment according to the present invention.
Figure 9:
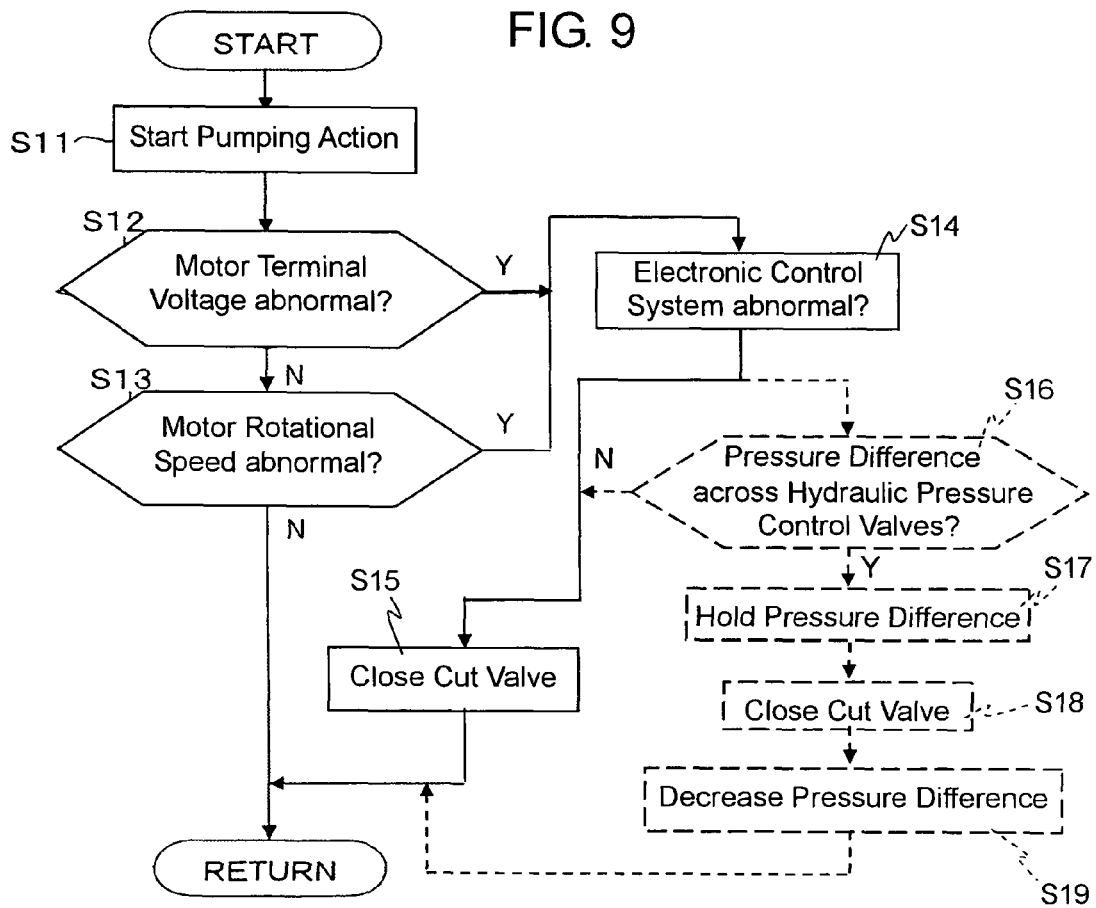
FIG. 9 is a flow chart of a program for closing a cut valve in the event of abnormalities in the fourth embodiment.
Figure 10:
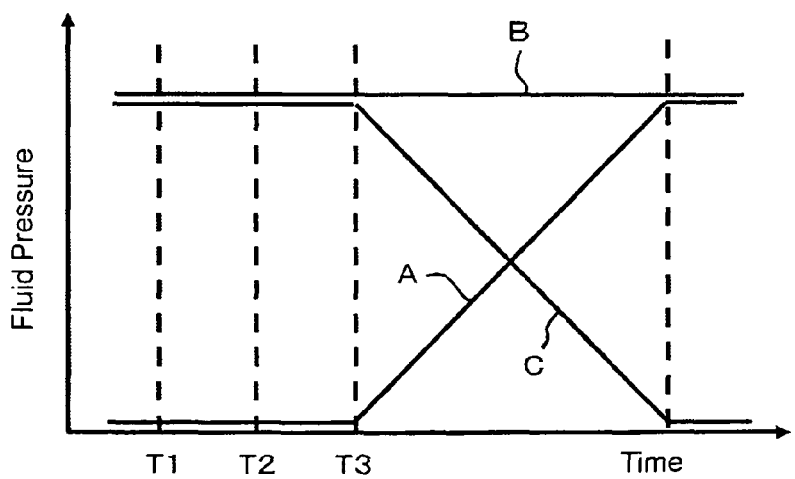
FIG. 10 is a time chart used in controlling hydraulic pressure control valves in the fourth embodiment.

Reference is made to FIGS. 8 to 10 for describing the vehicle brake system in a fourth embodiment according to the present invention. The brake system in the fourth embodiment is constructed by providing a cut valve 80 which is electronically controllable to be opened and closed selectively, on the inlet port side of the fluid absorbing mechanism 153 in the foregoing third embodiment. The cut valve 80 serves not to supply fluid to the fluid absorbing mechanism 153 when closed in the event of, e.g., a failure or malfunction in the pumps 38 of the controlled hydraulic pressure control device 43. Thus, with the cut valve 80 being closed, the entire quantities of the fluids discharged from the master cylinder 25 upon stepping of the brake pedal 20 are supplied toward the wheel brakes 30, whereby the brake force depending on the pedal stroke can be secured without stretching or elongating the pedal stroke required to generate the brake force.

To cope with the power failure of a vehicle battery, as shown in FIG. 8, the cut valve 80 is constituted by an electromagnetic valve, for example, which is closed when no electric current is applied to a solenoid 80a thereof. The cut valve 80 is normally held in the open state with the solenoid 80a being energized. However, when the solenoid 80a is deenergized in the event of the failure of either pump 38 or when no electric current is applied to the solenoid 80a in the event of the power failure, the cut valve 80 is switched into the closed state, whereby the supply of fluid to the fluid absorbing mechanism 153 is discontinued.

The failure of either pump 38 may occur, for example, when the breaking of a wire in the electric motor 39 causes the pump 38 to be unable to drive or when foreign matter entering the electric motor 39 or the pump 39 causes the same to be unable to rotate. Such failure is detected by a suitable wire breaking detection means or by a suitable rotation detection means and is judged as the failure of the pumps 38.

FIG. 9 is a program flow chart executed by the brake ECU 13 for closing the cut valve 80 upon detection of the failure of the pumps 38. When a command is issued to drive the pumps 38, the program starts, and the electric motor 39 is started to make the pumps 38 perform the pumping action (step S11). Then, at step S12, judgment is made of whether or not, an abnormality has occurred with the terminal voltage of the electric motor 39. If no abnormality has occurred, another judgment is made at step S13 of whether or not, the rotational speed of the electric motor 39 is normal, and if no abnormality has occurred, the program return is performed.

On the contrary, if the occurrence of the abnormality is judged at step S12 or S13, the program proceeds to step S14, wherein something abnormal is confirmed to have occurred. Step S15 is then reached, wherein a command to close the cut valve 80 is outputted before the processing of a program return.

In this manner, during the driving of the pumps 38, it is detected that either pump 38 is not discharging fluid at a required flow rate due to the failure of the electric control system which may be caused by, e.g., the terminal voltage abnormality of the electric motor 39 or the rotational speed abnormality, and the cut valve 80 is closed upon the detection of such abnormality. When the brake pedal 20 is manipulated in the event of the failure of the electric control system, the fluid pushed out from the master cylinder 25 is all supplied toward the wheel brakes 30 without being supplied to the fluid absorbing mechanism 153. As a consequence, the brake force depending on the pedal stroke can be secured without elongating the pedal stroke required to generate the brake force.

Where the failure of the pumps 38 occurs with the brake pedal 20 being stepped on, fluid would otherwise be flown into the flow absorbing mechanism 153, resulting in a decrease in pressure in the wheel brakes 30 at the same time, if pressure differences across the proportional control valves 32f, 32r were made to be small before closing the cut valve 80. To obviate this shortcoming, where the proportional control valves 32f, 32r have such pressure differences thereacross, control is performed after the detection of the pumps 38 failure at time T1 to first close the cut valve 80 at time T2 and then, to make smaller the pressure differences (C) across the proportional control valves 32f, 32r from time T3, as shown in FIG. 10. This way of controlling the cut valve 80 and the proportional control valves 32f, 32r in this order helps not to lower the pressure (B) in the wheel brakes 30 and can be realized by adding steps S16-S19 in FIG. 9. That is, the flow chart in FIG. 9 is modified as indicated by the broken line, wherein step S14 is followed by step S16 to judge whether or not, the proportional control valves 32f, 32r have a substantial pressure difference thereacross. If so, steps S17-S19 are executed to hold the pressure difference until the cut valve 80 is deenergized and finally, to decrease the pressure difference after the closing of the cut valve 80. In FIG. 10, symbol (A) indicates the pressure in the master cylinder 25.

In the brake system in the fourth embodiment, the cut valve 80 comprises an electromagnetic valve and is automatically closed at the time of electric power interruption. Thus, it becomes possible to close the cut valve 80 immediately at the time of a failure in the electric system. In addition, where the pumps 38 fall in failure with the proportional control valves 32f, 32r having pressure differences thereacross, the proportional control valves 32f, 32r are controlled to make such pressure differences smaller after the closing of the cut valve 80, so that the flow absorbing mechanism 158 is able to function appropriately while obviating the drawback that the flow absorbing mechanism 158 is filled up with fluid as a result of controlling the proportional control valves 32f, 32r.

The aforementioned cut valve 80 may also be closed at the time of an abrupt braking manipulation in addition to being closed not to supply fluid to the flow absorbing mechanism 153 at the time of the failure in the pumps 38. In this modified form, since the closing of the cut valve 80 works to block the inflow of the fluid into the flow absorbing mechanism 153, it becomes possible to supply the entire quantity of the flow discharged from the master cylinder 25 toward the wheel brakes 30.

Fifth Embodiment

Figure 11:
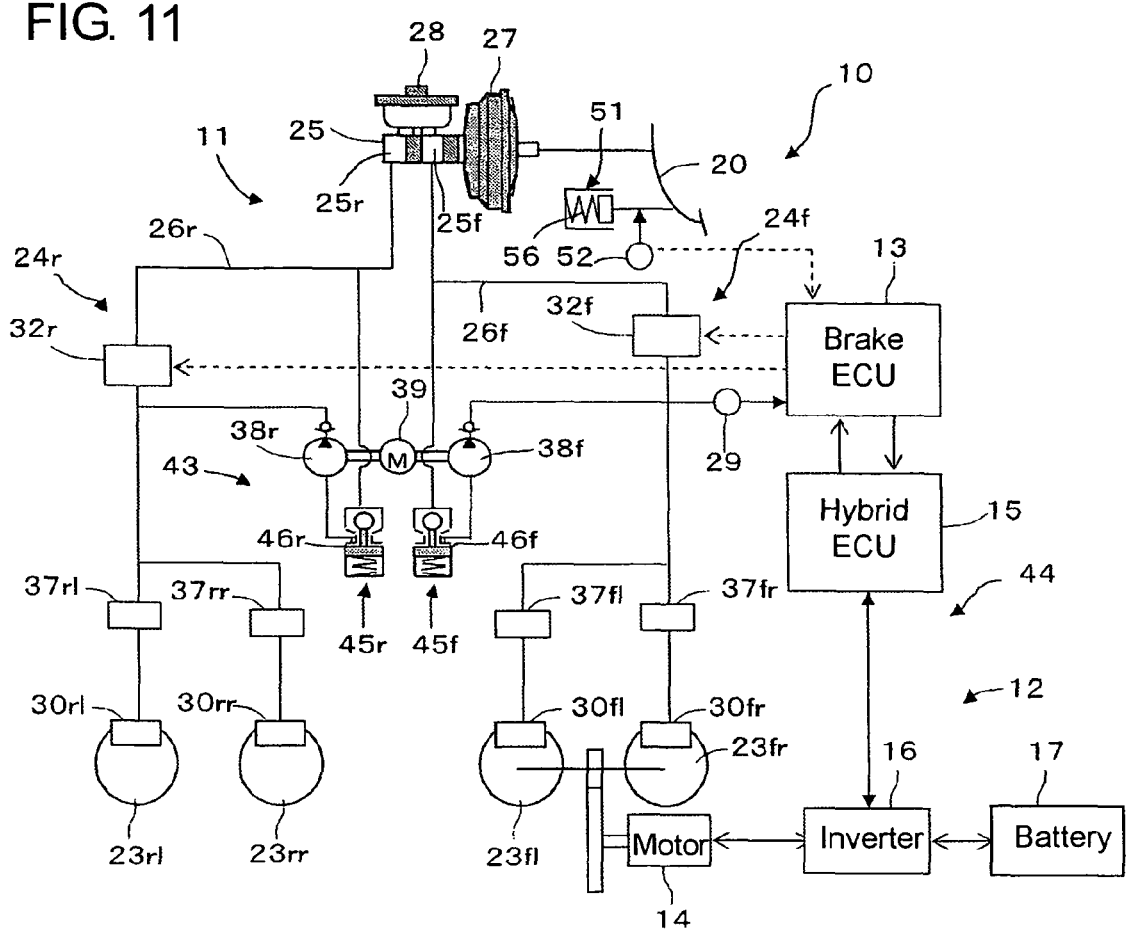
FIG. 11 is a system diagram of a vehicle brake system in a fifth embodiment according to the present invention.
Figure 12:
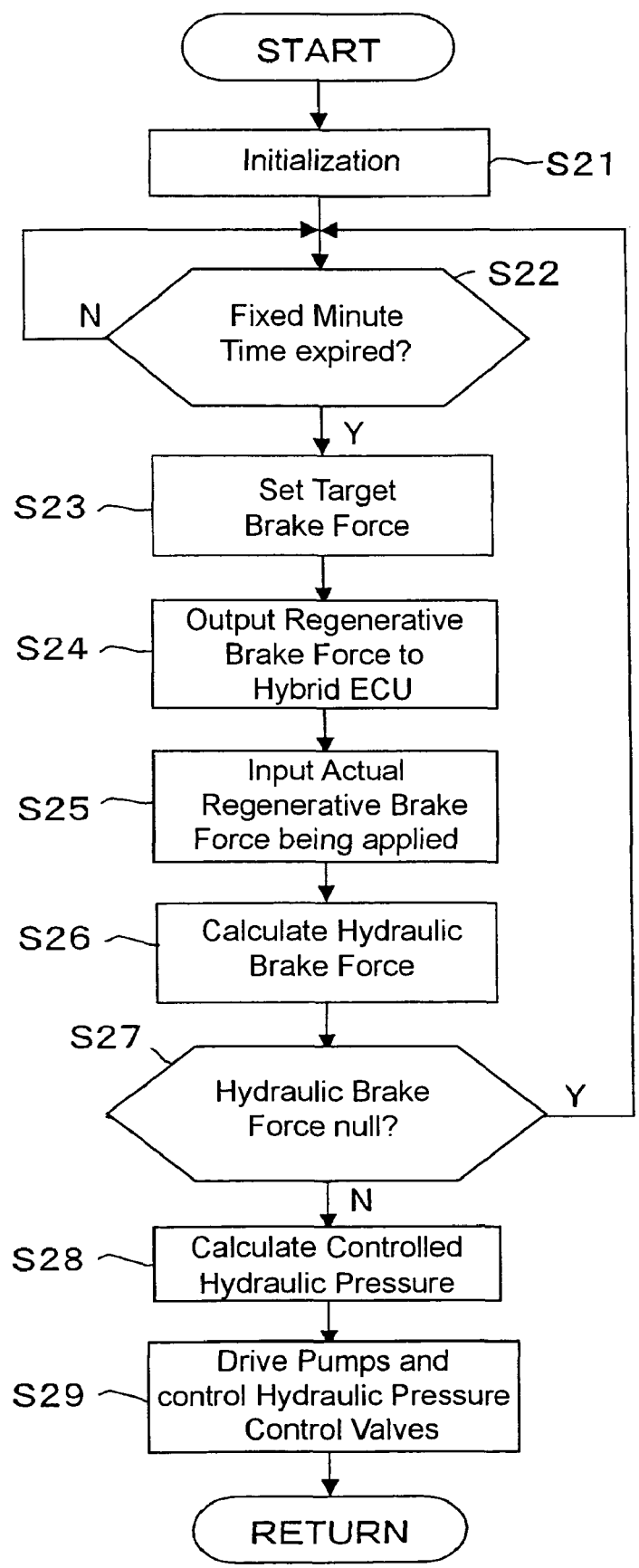
FIG. 12 is a flow chart of a cooperation control between a hydraulic brake device and a regenerative brake device in the fifth embodiment.
Figure 13:
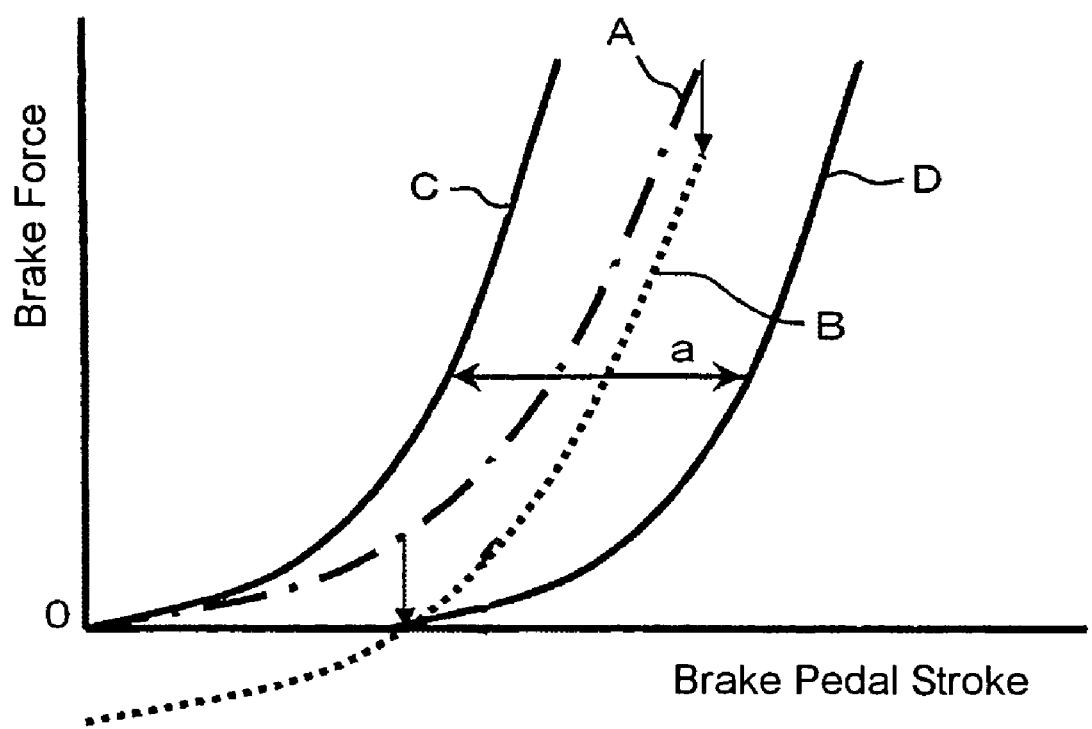
FIG. 13 is a graph showing the relation between brake pedal stroke and brake force.

FIGS. 11 to 13 show the vehicle brake system 10 in a fifth embodiment according to the present invention. The difference of the brake system 10 in the fifth embodiment from that in the foregoing first embodiment is that a regenerative brake force is utilized to apply an additional brake force to the front wheels 23fl, 23fr. Therefore, components different from those in the first embodiment will be described hereafter, and components which are identical or same as those in the first embodiment are designated by the same reference numerals in these figures and will be omitted from being described in detail.

As shown in FIG. 11, the vehicle brake system 10 comprises a hybrid vehicle brake system. The hybrid vehicle brake system 10 is provided with the hydraulic brake device 11, a regenerative brake device 12, a brake ECU 13 for cooperatively controlling the hydraulic brake device 11 and the regenerative brake device 12, a hybrid ECU 15 responsive to a demand value from the brake ECU 13 for controlling an electric motor 14 through an inverter 16, and so on. The brake ECU 13 constitutes an electronic control device for controlling the regenerative brake device 12 and the controlled hydraulic pressure control device 43.

A rotational shaft of the electric motor 14 is reduced in rotational speed through a gear train (not numbered) and is connected all the time to the left and right front wheels 23fl, 23fr. The inverter 16 converts a direct-current electric power discharged from a vehicle-mounted battery 17 into an alternating-current electric power in dependence on a control signal supplied from the hybrid ECU 15 and supplies the alternating-current electric power to the electric motor 14. The inverter 16 also converts an alternating-current electric power generated by the electric motor 14 into a charging electric power and charges the vehicle-mounted battery 17 with the charging electric power.

The regenerative brake device 12 is composed of the electric motor 14 rotationally connected to the front wheels 23f and a regenerative brake force generation device 44 for enabling the electric motor 14 to perform a regenerative brake operation so that a regenerative brake force is generated on the front wheels 23f connected to the electric motor 14. The regenerative brake force generation device 44 is composed of the hybrid ECU 15, the inverter 16 and the like.

The brake ECU 13 operates to set a target brake force for the wheels 23 to generate in dependence on the moving stroke of the brake pedal 20 and to input the target brake force as the regenerative brake force to the regenerative brake force generation device 44. The brake ECU 13 also operates to receive a signal indicative of an actual regenerative brake force which the regenerative brake force generation device 44 is actually generating in dependence on the target brake force, then to calculate as a required hydraulic brake force the difference between the target brake force and the actual regenerative brake force, and finally, to calculate a controlled hydraulic pressure which is to be supplied to the wheel brakes 30 in order to make the wheels 23 generate the hydraulic brake force. Further, in the brake ECU 13, a cooperative control program shown in FIG. 12 in the form of a flow chart is beforehand stored for applying a control electric current to the linear solenoids 33 of the proportional control valves 32 so that the pumps 38 driven by the electric motor 39 supplies the wheel brakes 30 with brake fluid of the pressure which coincides with the controlled hydraulic pressure.

The regenerative brake device 12 is controlled within a range that enables the regenerative brake to be performed and that varies at respective time points in dependence on the charging state of the battery 17 as well as on the operation state of the electric motor 14. That is, there are calculated a limiting value for the regenerative brake force depending on the charging state of the battery 17 and another limiting value for the regenerative brake force depending on the rotational speed of the electric motor 14 corresponding to the vehicle speed, and the range enabling the regenerative brake to be performed is determined not to exceed a smaller one of these limiting values.

Although not illustrated in the drawings, the brake system 10 in the fifth embodiment also incorporates in the vacuum type booster device 27 a stroke absorbing mechanism 53 of the same construction as described in the foregoing first embodiment. The play or idle stroke (a) of the stroke absorbing mechanism 53 is desired to be set as an amount which is approximate to the moving stroke by which the master cylinder 25 is to be moved where the wheel brakes 30 by themselves only attain a deceleration equal to the maximum deceleration which can be attained by the regenerative brake device 12.

Next, description will be made regarding the operation of the hybrid vehicle brake system 10 in the fifth embodiment as constructed above. When the brake pedal 20 is stepped on, the input rod 61 (FIG. 3) of the vacuum type booster device 27 is advanced in the same manner as described in the foregoing first embodiment to bring the air valve section 65 into an atmospheric air leading state, whereby the atmospheric air is introduced into the variable pressure chamber 66. Thus, the valve piston 63 of the vacuum type booster device 27 is advanced as it nearly follows the input rod 61, to push the stroke absorbing mechanism 53. As mentioned earlier, the setting load of the spring 54 of the stroke absorbing mechanism 53 has been set to be greater than the setting load of the spring 22 in the master cylinder 25. Thus, at an early stage of the stepping operation of the brake pedal 20, the stroke absorbing mechanism 53 does not act effectively and is not deformed, and instead, the master pistons 21f, 21r of the master cylinder 25 are first advanced to block the communications between the hydraulic chambers 25f, 25r of the master cylinder 25 and the reservoir tank 28. This causes the hydraulic pressure in the hydraulic chambers 25f, 25r of the master cylinder 25 to increase. Thus, the load which is determined by multiplying the increased hydraulic pressure with the chamber cross-section area of the master cylinder 25 acts on the stroke absorbing mechanism 53, whereby the spring 54 of the stroke absorbing mechanism 53 is compressed to absorb the play or idle stroke (a). As a consequence, the valve piston 63 of the vacuum type booster device 27 is advanced relative to the master pistons 21f, 21r.

In this way, even when the brake pedal 20 is stepped on, the stroke absorbing mechanism 53 acts through its absorbing function to suppress the master pistons 21f, 21r to move a shorter distance than the movement of the valve piston 63 of the vacuum type booster device 27, so that a low pressure meeting the shorter distance only is generated in the hydraulic chambers 25f, 25r of the master cylinder 25.

On the other hand, the simulator 51 causes the brake pedal 20 to receive a reaction force corresponding to the manipulation stroke or movement of the brake pedal 20. Thus, the driver can feel the reaction force corresponding to the manipulation movement (i.e., stepping amount) of the brake pedal 20, regardless of the hydraulic pressure being generated in the master cylinder 25. The manipulation stroke of the brake pedal 20 is detected by the stroke sensor 52, and when this detection signal is inputted to the brake ECU 13, the same executes the cooperative control program shown in FIG. 12 as described hereinafter.

With the starting of the cooperative control program, initialization is executed to reset various temporal memories like counters, flags or the like (step S21), and those steps subsequent to step S22 are executed each time the lapse of a fixed or predetermined minute time is judged at step S22.

The brake ECU 13 first calculates a target brake force to be generated on the wheels 23 by reference to a map, table or calculation expression (all not shown) which has been stored in the memory therein to define the relation between brake pedal strokes and target brake forces (step S23), and outputs the target brake force as regenerative brake force to the hybrid ECU 15 (step S24). The hybrid ECU 15 executes the open-close control of the inverter 16 in dependence on the regenerative brake force (i.e., target brake force), whereby the electric motor 14 is placed under regenerative braking to apply a regenerative brake force to the front wheels 23f. The hybrid ECU 15 then calculates an actual regenerative brake force which the electric motor 14 is actually applying to the front wheels 23f, on the basis of an electric current of the regenerative electric power detected by a sensor (not shown) and inputs the calculated actual regenerative brake force to the brake ECU 13 (step S25).

The brake ECU 13 calculates a hydraulic brake force being the difference between the target brake force and the actual regenerative brake force (step S26), and judges whether or not, the hydraulic brake force is null (step S27). That is, where the difference is zero because the entirety of the target brake force can be covered by the regenerative brake force, the generation of any controlled hydraulic pressure is judged to be unnecessary, and the program is returned to step S22.

On the contrary, when the hydraulic brake force which is the difference between the target brake force and the actual regenerative brake force is not null, the brake ECU 13 calculates a controlled hydraulic pressure which is to be applied to the wheel brakes 30 to make the wheels 23 generate the hydraulic brake force corresponding to the difference, by reference to a map, table or calculation expression (not shown) (step S28). Then, the brake ECU 13 drives the pumps 38 by starting the electric motor 39 and applies a control current to the linear solenoids 33 of the proportional control valves 32 so that the hydraulic pressure of the brake fluid supplied from the pumps 38 to the wheel brakes 30 comes to coincide with the controlled hydraulic pressure (step S29).

Thus, the fluids supplied from the pumps 38 are controlled by the proportional control valves 32 to become the controlled hydraulic pressure and are supplied to the wheel brakes 30. Accordingly, the hydraulic brake device 11 controls the wheels 23 to generate a hydraulic brake force which is equal to the difference between the target brake force and the actual regenerative brake force. When a substantial variation of the regenerative brake force which the regenerative brake device 12 is actually generating, relative to the determined regenerative brake force is detected through the processing at step 26 and the like, the controlled hydraulic pressure is varied by controlling the driving of the pumps 38 of the hydraulic brake device 11 and by controlling the proportional control valves 32 through steps S27 to S29 and the like, whereby the controlled hydraulic brake force depending on the controlled hydraulic pressure so varied is generated on the wheels 23 to compensate for an increase or decrease of the regenerative brake force caused by the detected variation.

FIG. 13 is a graph showing the relation between brake pedal strokes and brake forces. Curve A indicates target brake forces, whereas curve B indicates brake forces determined by subtracting from the target brake forces the maximum regenerative brake forces which the regenerative brake force generation device 44 can generate, at respective brake pedal strokes. Further, curve C indicates hydraulic brake forces that the property of the wheel brakes 30 would determine relative to the brake pedal strokes if the aforementioned stroke absorbing mechanism 53 were not be deformed at all, whereas curve D indicates hydraulic brake forces that the property of the wheel brakes 30 would determine relative to the brake pedal strokes if the aforementioned stroke absorbing mechanism 53 were deformed fully.

For the purpose of realizing the target brake forces at respective brake pedal strokes, as shown in FIG. 13, the target brake forces A are desired to be smaller all the time than the hydraulic brake forces C which would be generated if the stroke absorbing mechanism 53 were not be deformed at all, and as also shown in FIG. 13, the brake forces B determined by subtracting the maximum regenerative brake forces from the target brake forces are desired to be greater all the time than the hydraulic brake forces D which would be generated if the stroke absorbing mechanism 53 were deformed fully.

Where these two requirements are satisfied, the quantity of fluid to generate the required hydraulic brake force becomes to be less than the quantity determined by multiplying the moving stroke of the input rod 61 with the chamber cross-section area of the master cylinder 25 but to be greater than the quantity determined by multiplying the chamber cross-section area of the master cylinder 25 with the difference between the moving stroke of the input rod 61 and the maximum deformation amount of the stroke absorbing mechanism 53. This equally applies in either of the case that no regenerative brake force can be generated due to the charging state of the battery 17 and the rotational state of the electric motor 14 and the case that the regenerative brake force can be generated to the maximum.

From this, it results that the stroke absorbing mechanism 53 has been deformed all the time in an intermediate state (intermediate between non-deformation and the maximum deformation) when the required hydraulic brake force is being generated. This means that in that state, the vacuum type booster device 27 is outputting a small output only to deform the stroke absorbing mechanism 53 in the intermediate state and that a low pressure only is being generated in the hydraulic chambers 25f, 25r of the master cylinder 25 in correspondence to the small output. Therefore, it becomes possible for the regenerative brake force to cover the entirety of a target brake force where the same is weak.

Here, let it be now assumed that the stroke absorbing mechanism 53 is not deformed at all. On this assumption and where the target brake force is stronger than the hydraulic brake force which the property of the wheel brakes 30 determines with the brake pedal stroke, the fluid quantity discharged from the master cylinder 25 is unable to make the hydraulic brake force reach the target brake force even with the stroke absorbing mechanism 53 being in the non-deformation state. Thus, if no regenerative force is generated at this time, the pumps 38 operate to draw the fluid in the reservoir tank 28 by way of the master cylinder 25 and to discharge the fluid. At this time, since the pumps 38 are forced to the drawing action with the communication between the master cylinder 25 and the reservoir tank 28 being blocked, the resistance to the pump drawing action becomes greater, thereby resulting in poor responsiveness. Further, as a result, since superfluous quantity of fluid is drawn into the master cylinder 25, a scarcity of the play or idle stroke may arise if the regenerative brake force is generated subsequently. This shortcoming can however be compromised if the target brake force is only of the extent that it slightly exceeds a desired range.

Let it then be assumed that the brake force which is left by subtracting from a target brake force the maximum regenerative brake force which can be generated by the regenerative brake force generation device 44 is able to deform the stroke absorbing mechanism (the idling component) 53 fully. On this assumption and where the target brake force is weaker than the hydraulic brake force which the property of the wheel brakes 30 determines with the brake pedal stroke, if the regenerative brake force is generated to the maximum, the sum of the regenerative brake force and the hydraulic brake force which is built up by the flow quantity discharged from the master cylinder 25 exceeds the target brake force even with the stroke absorbing mechanism 53 being deformed to the maximum. However, also in this case, the brake pedal feeling is not varied because the vacuum type booster 27 is constructed as mentioned earlier. The only problem in this case is that the actual brake force exceeds the target brake force, and this problem can also be compromised if the target brake force is only of the extent that it is slightly less than a desired range.

As described above, also in the fifth embodiment, the brake system 10 can be constructed to be highly reliable against a failure or malfunction by having two means for raising the brake hydraulic pressure, that is, the vacuum booster device 27 and the pumps 38 of the controlled hydraulic pressure control device 43. In addition, by properly setting the play or idle stroke of the stroke absorbing mechanism 53, it becomes possible for the regenerative brake force to substantially cover the entirety of a target brake force which is set when the brake manipulation force is weak, and hence, it becomes possible to enhance the energy efficiency of the brake system 10.

The hybrid vehicle brake system 10 in the foregoing fifth embodiment has been described taking an example that the same stroke absorbing mechanism 53 as described in the foregoing first embodiment is used as the play or idling component which absorbs the driver's braking manipulation stroke by a predetermined amount. However, it is possible even in the hybrid vehicle brake system 10 that instead of the stroke absorbing mechanism 53, the idling component may be replaced by the fluid absorbing mechanism 153 shown in FIG. 7, the modified fluid absorbing mechanism 153 additionally provided on its inlet port side with the restriction component 70 for restraining the inflow quantity of fluid as shown in FIG. 8, the modified fluid absorbing mechanism 153 using the cut valve 80 as shown in FIG. 8, or any other equivalent thereof.

Although also in the foregoing fifth embodiment, the vehicle brake system 10 is applied to a hybrid vehicle, it may also be applicable to an electric vehicle having the electric motor 14 connected to the wheels 23.

In the foregoing embodiments, the front-rear independent piping arrangement of the hydraulic brake system 11 is provided in a front-engine, front-drive (FF) vehicle. However, the piping arrangement may be provided in a front-engine, rear-drive (FR) vehicle. Further, the piping arrangement of the hydraulic brake system may be provided in a FF or FR vehicle in a cross (X) fashion, wherein the master cylinder 25 may be connected to supply the fluid discharged from the hydraulic chamber 25f to the wheel brakes 30fr, 30rl for the right front wheel 23fr and the left rear wheel 23rl and to supply the fluid discharged from the hydraulic chamber 25r to the wheel brakes 30fl, 30rr for the left front wheel 23fl and the right rear wheel 23rr.

Each of the foregoing embodiments uses the vacuum type booster device 27 as booster device. The booster device may be replaced by a hydraulic booster device of the type that accumulates the fluid pressure generated by a pump and boosts the braking manipulation force exerted on the brake pedal by applying the accumulated fluid pressure to a piston.

Also in each of the foregoing embodiments, the fluid pressure from the pumps 38 driven by the electric motor 39 is controlled by the proportional control valves 32 controllable by the solenoids 33 so that the pressure of the brake fluid supplied to the wheel brakes 30 comes to coincide with a variably set controlled hydraulic pressure. However, fluid control valves for that purpose are not limited to the proportional control valves 32. Instead, there may be used electromagnetic valves of ON-OFF operation type, and a duty control of the electromagnetic valves may be performed each to generate a desired controlled hydraulic pressure.

Although in each of the foregoing embodiments, the front wheel brake system 24f and the rear wheel brake system 24r are provided with their own pumps 38 and their own proportional control valves 32, either of the pumps 38 and either of the proportional control valves 32 are used for both of the front and rear wheel brake systems 24f, 24r.

Finally, various features and many of the attendant advantages in the foregoing embodiments will be summarized as follows:

In the foregoing first embodiment typically shown in FIGS. 1, 3 and 4, the play or idling component 53 for absorbing the moving stroke of the brake pedal 20 by the predetermined amount (a) is arranged between the booster device 27 for boosting the braking manipulation force exerted on the brake pedal 20 and the hydraulic pressure control device 43 having the pumps 38 for drawing operating fluid on the side of the master cylinder 25 to discharge the operating fluid toward the side of the wheel brakes 30 and the hydraulic pressure control valves 32. With this construction, when the brake pedal 20 is stepped on, the idling component 53 absorbs a part of the manipulation stroke of the brake pedal 20, while the electronic control device 13 controls the hydraulic pressure control valves 32 based on a detection signal from the stroke sensor 52 for detecting the manipulation stroke of the brake pedal 20, whereby a required controlled fluid pressure is supplied to wheel brakes 30. According to the brake system 10, there can be realized a brake-by-wire configuration in which even in the event of a failure of the electric system, it is possible to secure a brake force equivalent to that generated in a normal operation state.

Also in the foregoing first embodiment typically shown in FIGS. 3 and 4, the idling component is constituted by the stroke absorbing mechanism 53 including the spring 54 interposed between the output member 63 of the booster device 27 and the input member 21f of the master cylinder 25 and the suspending members 55a, 55b for restricting the maximum length of the spring 54. Thus, at the early stage of the brake pedal stepping manipulation, the operation stroke of the master cylinder 25 is suppressed by the stroke absorbing mechanism 53 to be shorter than that of the booster device 27. Thus, it becomes possible to set the output power of the booster device 27 to a small power that is only enough to deform the stroke absorbing mechanism 53 and hence, to make the master cylinder 25 only generate in the hydraulic chambers 25r, 25f a low pressure corresponding to the small output power of the booster device 27.

In the foregoing second embodiment shown in FIG. 6, the idling component is constituted by the fluid absorbing mechanism 153 including the piston 59 fluid-tightly and slidably receiving in the cylinder 57, which has one end connected to the fluid passage 26r between the master cylinder 25 and the hydraulic pressure control device 43 and the other end exposed to the atmosphere, and the spring 58 for urging the piston 59 toward the one end of the cylinder 57. At the early stage of the stepping on the brake pedal 20, the fluid absorbing mechanism 153 absorbs the fluid from the master cylinder 25 and suppresses the pressure increase in the hydraulic chambers 25r, 25f of the master cylinder 25. Thus, the idling component can be constructed easily by adding the fluid absorbing mechanism 153 without changing the constructions of the booster device 27 and the master cylinder 25, and the same or equivalent advantages as attained by the stroke absorbing mechanism 53 can be realized.

In the foregoing third embodiment shown in FIG. 7, the idling component 153 is provided with the damper mechanism 70 for suppressing the speed at which the idling component 153 absorbs the idle stroke. Thus, restriction is imposed on the speed at which the idling component 153 absorbs the manipulation stroke of the brake pedal 20 when the same is stepped on. For example, the idle stroke absorbing speed can be suppressed at the time of an abrupt braking manipulation. As a result, the pumps 38 for generating the controlled fluid pressure are not needed to be uselessly increased in capacity, but it can, be realized nevertheless to secure the responsiveness which the brake system needs at the time of an abrupt braking.

In the foregoing third embodiment shown in FIG. 7, a restriction element 71 for restricting the quantity of the fluid absorbed by the fluid absorbing mechanism 153 is provided on the inlet port side of the fluid absorbing mechanism 153. At the time of an abrupt braking manipulation, the restriction element 71 restricts the quantity of the fluid absorbed by the fluid absorbing mechanism 153, and thus, the substantial parts of the fluids discharged from the master cylinder 25 are supplied to the wheel brakes 30. Therefore, the pumps 38 for generating the controlled fluid pressure are not needed to be uselessly increased in capacity, but it can be realized nevertheless to secure the responsiveness which the brake system needs at the time of an abrupt braking.

Also in some of the foregoing embodiments typically shown in FIG. 1, the booster device 27 is constructed not to apply a manipulation reaction force to the input member 61 thereof. Instead, the pseudo reaction force by the simulator 51 is primarily applied to the brake pedal 20. This ensures that the reaction force from the booster device 27 to the brake pedal 20 is not generated even where a deviation from the range for the idle stroke (a) takes place due to the variation of so-called consumed fluid quantity by the wheel brakes 30 from the design value or even where a failure in the electric system causes the pumps 38 to be incapable. Thus, it becomes possible to make the relation between the stepping forces and the strokes of the brake pedal 20 remain in that relation which depends on the simulator 51. Further, since a reaction force transmission mechanism like a rubber disc which would otherwise be provided in conventional vacuum type booster devices becomes unnecessary, it is possible to ease the installation of the stroke absorbing mechanism 53.

In the foregoing fifth embodiment shown in FIGS. 11 and 12, the regenerative brake device 12 is provided for generating a regenerative brake force on some of the wheels 30f, and the electronic control device 13 is configured to control the regenerative brake device 12 and the pumps 38 and the hydraulic pressure control valve 32 of the hydraulic pressure control device 43 so that the sum of the regenerative brake force generated by the regenerative brake device 12 and the brake force generated by the wheel brakes 30 operated by the fluid pressure outputted from the hydraulic pressure control device 43 comes to coincidence with the target brake force. Thus, the hydraulic brake force by the hydraulic pressure control device 43 is not required to be generated more than the difference between the target brake force and the actual regenerative brake force, and in the case of the braking manipulation force being weak, it becomes possible for the regenerative brake force to cover the substantially entirety of the target brake force by properly setting the idle stroke (a) of the idling component 53. In this embodiment, it does not take place to give the driver an unpleasant feeling in manipulating the brake pedal 20 even when the brake force by the wheel brakes 30 is increased or decreased to cope with the variation in the regenerative brake force. In addition, besides the breaking operation by the driver's muscular power, the means for applying the brake force includes three kinds, that is, the regenerative brake device 44, the booster device 27 usually taking vacuum as its power source, and the pumps 38 of the battery driven hydraulic pressure control device 43, so that the reliability of the system can be enhanced.

Also in the foregoing fifth embodiment shown in FIGS. 11 and 12, the predetermined amount absorbed by the idling component 53 is set to an amount approximate to a stroke amount by which the master cylinder should move if the wheel brakes 30 attained by their decelerations a deceleration equal to the maximum deceleration which can be attained by the regenerative brake device 12. This enables the idling component 53 to work effectively, and in the case of the braking manipulation force being weak, it becomes possible for the regenerative brake force to cover the substantially entirety of the target brake force.

In the foregoing fourth embodiment shown in FIGS. 8 to 10, the fluid absorbing mechanism 153 is arranged between the master cylinder 25 and the hydraulic pressure control device 43 for absorbing the moving stroke of the brake pedal 20 by the predetermined amount, and the cut valve 80 is arranged between the master cylinder 25 and the fluid absorbing mechanism 153 for blocking the communication therebetween when an abnormality in the system causes the pumps 38 to be incapable. Thus, the cut valve 80 prevents the fluid absorbing mechanism 153 from consuming the discharge fluid from the master cylinder 25. In the event of the pumps 38 falling in trouble, the fluid absorbing mechanism 153 is prevented by closing the cut valve 80 from consuming the discharge fluid from the master cylinder 25. As a result, the brake pedal stroke is not elongated, and it becomes possible to secure the brake force which is approximately equal to that generated at a normal operation state.

Also in the foregoing fourth embodiment typically shown in FIG. 8, the cut valve 80 which is closed at the time of deenergization is employed as the electromagnetic valve. Thus, it is possible to close the cut valve 80 immediately in the event of the electric system falling in a failure.

Also in the foregoing fourth embodiment typically shown in FIGS. 2, 8 and 9, the pressure difference across the hydraulic pressure control valves 32 is lowered after the closing of the cut valve 80 when the pumps 38 of the hydraulic pressure control device 43 fall in a failure with the hydraulic pressure control valves 32 having the pressure difference thereacross. Thus, even when the pumps 38 fall in a failure with the brake pedal 20 being stepped on, it can be prevented that the pressure in the wheel brakes 30 is decreased as a result that the fluid discharged from the master cylinder 25 flows into the flow absorbing mechanism 153. Further, since the hydraulic pressure control valves 32 can be controlled not to make the flow absorbing mechanism 153 filled up with fluid, it can be realized to operate the flow absorbing mechanism 153 reliably.

Obviously, numerous further modifications and variations of the present invention are possible in light of the above teachings. It is therefore to be understood that within the scope of the appended claims, the present invention may be practiced otherwise than as specifically described herein.

What is claimed is:

1. A vehicle brake system comprising:
   a booster device for boosting the braking manipulation force exerted on a brake pedal;
   a master cylinder operatively connected to the booster device;
   a reservoir tank storing brake fluid for replenishing brake fluid to the master cylinder;
   wheel brakes provided for respective vehicle wheels and connected to the master cylinder;
   a hydraulic pressure control device interposed between the master cylinder and the wheel brakes and having a pump for drawing operating fluid on the side of the master cylinder to discharge the operating fluid toward the side of the wheel brakes and a hydraulic pressure control valve capable of restraining the flow of the operating fluid from the side of the wheel brakes toward the side of the master cylinder;
   a stroke sensor for detecting the moving stroke of the brake pedal;
   a simulator for applying to the brake pedal a pseudo reaction force corresponding to the moving stroke of the brake pedal;
   an idling component interposed between the booster device and the hydraulic pressure control device and configured to operate only in a state that communication between the master cylinder and the reservoir tank is blocked, for absorbing the moving stroke of the brake pedal by a predetermined amount; and
   an electronic control device for controlling the hydraulic pressure control device based on an input from the stroke sensor.

2. The vehicle brake system as set forth in claim 1, wherein the idling component is constituted by a stroke absorbing mechanism comprising:
   a spring interposed between an output member of the booster device and an input member of the master cylinder; and
   suspending members for restricting the maximum length of the spring.

3. The vehicle brake system as set forth in claim 1, wherein the idling component is constituted by a fluid absorbing mechanism comprising:
   a piston fluid-tightly and slidably received in a cylinder having one end connected to a fluid passage between the master cylinder and the hydraulic pressure control device and the other end exposed to the atmosphere; and
   a spring for urging the piston toward the one end of the cylinder.

4. The vehicle brake system as set forth in claim 1, wherein the idling component is provided with a damper mechanism for suppressing the idling absorbing speed of the idling component.

5. The vehicle brake system as set forth in claim 3, wherein a restriction element for restricting the fluid quantity absorbed by the fluid absorbing mechanism is provided on an inlet port side of the fluid absorbing mechanism.

6. The vehicle brake system as set forth in claim 1, wherein the booster device is constructed not to apply a manipulation reaction force to an input member thereof.

7. The vehicle brake system as set forth in claim 1, further comprising:
   a regenerative brake device for generating a regenerative brake force on some of the vehicle wheels;
   wherein the electronic control device is configured to calculate a target brake force based on an input from the stroke sensor and to control the regenerative brake device and the pump and the hydraulic pressure control valve of the hydraulic pressure control device within a range that enables the regenerative brake to be performed at a given time point so that the sum of the regenerative brake force generated by the regenerative brake device and the brake force generated by the wheel brakes operated by the fluid pressure outputted from the hydraulic pressure control device comes to coincidence with the target brake force.

8. The vehicle brake system as set forth in claim 7, wherein the predetermined amount absorbed by the idling component is set to an amount approximate to a stroke amount by which the master cylinder should move if the wheel brakes attained by their decelerations a deceleration equal to the maximum deceleration which can be attained by the regenerative brake device.

9. A vehicle brake system comprising:
   a booster device for boosting the braking manipulation force exerted on a brake pedal;
   a master cylinder operatively connected to the booster device;
   a reservoir tank storing brake fluid for replenishing brake fluid to the master cylinder;
   wheel brakes provided for respective vehicle wheels and connected to the master cylinder;
   a hydraulic pressure control device interposed between the master cylinder and the wheel brakes and having a pump for drawing operating fluid on the side of the master cylinder to discharge the operating fluid toward the side of the wheel brakes and a hydraulic pressure control valve capable of restraining the flow of the operating fluid from the side of the wheel brakes toward the side of the master cylinder;
   a stroke sensor for detecting the moving stroke of the brake pedal;
   a simulator for applying to the brake pedal a pseudo reaction force corresponding to the moving stroke of the brake pedal;
   a fluid absorbing mechanism arranged between the master cylinder and the hydraulic pressure control device and configured to operate only in a state that communication between the master cylinder and the reservoir tank is blocked, for absorbing the moving stroke of the brake pedal by a predetermined amount; and
   a cut valve arranged between the master cylinder and the fluid absorbing mechanism for blocking the communication between the maser cylinder and the fluid absorbing mechanism when an abnormality in the system causes the pump to be incapable of discharging pressurized fluid.

10. The vehicle brake system as set forth in claim 9, wherein the cut valve comprises an electromagnetic valve which is closed at the time of deenergization.

11. The vehicle brake system as set forth in claim 9, further comprising:
control means for lowering a pressure difference across the hydraulic pressure control valve after closing the cut valve when the pump of the hydraulic pressure control device falls in a failure with the hydraulic pressure control valve having the pressure difference thereacross.

12. A vehicle brake system comprising:
a booster device for boosting the braking manipulation force exerted on a brake pedal;
a master cylinder operatively connected to the booster device;
a reservoir tank storing brake fluid for replenishing brake fluid to the master cylinder;
wheel brakes provided for respective vehicle wheels and connected to the master cylinder;
a hydraulic pressure control device interposed between the master cylinder and the wheel brakes and having a pump for drawing operating fluid on the side of the master cylinder to discharge the operating fluid toward the side of the wheel brakes and a hydraulic pressure control valve capable of restraining the flow of the operating fluid from the side of the wheel brakes toward the side of the master cylinder;
a stroke sensor for detecting the moving stroke of the brake pedal;
a simulator for applying to the brake pedal a pseudo reaction force corresponding to the moving stroke of the brake pedal; and
means for absorbing the moving stroke of the brake pedal by a predetermined amount arranged between the master cylinder and the hydraulic pressure control device and configured to operate only in a state that communication between the master cylinder and the reservoir tank is blocked.

* * * * *